United States Patent [19]
Rappoport et al.

[11] Patent Number: 5,354,980
[45] Date of Patent: Oct. 11, 1994

[54] SEGMENTED MULTIPLEXER FOR SPECTROSCOPY FOCAL PLANE ARRAYS HAVING A PLURALITY OF GROUPS OF MULTIPLEXER CELLS

[75] Inventors: William Rappoport, Weston; Edward Zalewski, Sandy Hook; Peter Silverglate, Monroe, all of Conn.

[73] Assignee: Hughes Aircraft Company, Los Angeles, Calif.

[21] Appl. No.: 77,973

[22] Filed: Jun. 17, 1993

[51] Int. Cl.$^5$ ............................................. H01J 40/14
[52] U.S. Cl. .................................. 250/208.1; 250/226
[58] Field of Search ................. 250/208.1, 208.2, 226, 250/214 R; 257/440–445; 358/213.23, 213.22, 213.19

[56] References Cited

U.S. PATENT DOCUMENTS 4,242,706 12/1980 McCormack et al. ............... 257/443
5,155,348 10/1992 Ballingal et al. ................... 250/208.1

*Primary Examiner*—David C. Nelms
*Assistant Examiner*—Que T. Le
*Attorney, Agent, or Firm*—Michael W. Sales; Wanda K. Denson-Low

[57] ABSTRACT

A focal plane array employing a segmented multiplexer having differing unit cell capacitances and amplifiers in respective segments of the multiplexer. The segmented multiplexer accommodates and processes the maximum expected signal at differing illumination levels without saturation and provides for optimized noise levels in each of its segments. The focal plane array includes an array of detectors and an array of multiplexer cells respectively coupled thereto. The array of detectors comprises a plurality of groups of detector elements that each detect energy in a predetermined spectral region. The array of multiplexer cells comprise a plurality of groups of multiplexer cells that are respectively coupled to the plurality of groups of detector elements. Each multiplexer cell includes an integrating capacitor and an amplifier, and the integrating capacitor of each cell in a particular group has a predetermined capacitance whose charge integration capability corresponds to an expected maximum intensity level of radiation in the particular spectral region that is detected by the corresponding detector element in the detector array. The optimization of the characteristics of the integrating capacitor and amplifier provided for optimized detection of the radiation in that spectral region. By using more than one unit cell design, the response of each portion of the focal plane array is optimized to the range of expected intensities that will be incident on that portion of the focal plane array. In this manner, saturation is avoided in those portions of the focal plane that are expected to observe very high light intensities. In those portions of the focal plane that are expected to observe low light intensities, the cell amplifiers are designed to accommodate the lower intensity levels with decreased noise.

3 Claims, 4 Drawing Sheets

SEGMENTED MULTIPLEXER FOR SPECTROSCOPY FOCAL PLANE ARRAYS HAVING A PLURALITY OF GROUPS OF MULTIPLEXER CELLS

BACKGROUND

The present invention relates generally to focal plane arrays, and more particularly, to a segmented multiplexer for use in focal plane arrays employed in spectroscopy imaging and non-imaging applications, and the like.

In spectrometry applications, the spectral radiance of an illumination source, such as the sun or a blackbody, often varies strongly with wavelength in a fashion known a priori. This leads to nonuniform illumination levels at the focal plane of the spectrometer.

Heretofore, conventional focal plane detector arrays used for spectrometry applications have employed multiplexers that utilize a single unit cell design throughout the entire multiplexer. If the focal plane array is operated to avoid saturating at the highest signal levels produced by the illumination source that are incident on one section of it, signal to noise ratio in the adjacent low signal level portions suffer. By forcing one cell design to accommodate a range of intensity levels that may be incident on different portions of the focal plane array, the signal to noise ratio (SNR) and/or the dynamic range is severely compromised. Alternatively, conventional focal plane detector arrays used for spectrometry applications have employed multiple focal planes have been employed, which increases system complexity.

Therefore, it is an objective of the present invention to provide for an improved multiplexer design for focal plane arrays used for spectroscopy. It is a further objective of the present invention to provide for a focal plane array comprising a segmented multiplexer that is optimized to process light energy having varying light intensity levels at different portions of the focal plane array.

SUMMARY OF THE INVENTION

In order to meet the above and other objectives, the present invention comprises a focal plane array employing a segmented multiplexer having differing unit cell designs in respective segments of the multiplexer. As mentioned above, in spectrometry applications, the spectral radiance of an illumination source often varies strongly with wavelength in a fashion known a priori., which results in nonuniform illumination levels at the spectrometer focal plane. The present segmented multiplexer accommodates and processes the maximum expected signal at these differing illumination levels without saturation and provides for optimized noise levels in each of its segments.

More specifically, the present invention comprises a focal plane array that includes an array of detectors and a corresponding array of multiplexer cells respectively coupled thereto. The array of detectors comprises a plurality of groups of detector elements that each detect energy in a predetermined spectral region. The array of multiplexer cells comprise a plurality of groups of multiplexer cells that are respectively coupled to the plurality of groups of detector elements of the array of detectors. Each detector within the detector array converts photons into electronic charge. This charge flows into the corresponding multiplexer unit cell. Each multiplexer cell is comprised of transistors and capacitors which collect the charge generated within the detector layer, convert the charge into a voltage, and allow each cell's voltage to be sequentially switched to one or several video output ports. Within each spectral band group of the array, the design of the unit cell is optimized for the expected maximum illumination. In many cases, this optimization may only require that the capacitance value of the integration capacitor be different for each group. The capacitor is chosen such that the maximum signal charge provides a voltage level which is just below the saturation voltage.

In accordance with the principles of the present invention, by using more than one unit cell design, the response of each portion of the focal plane array is optimized to the range of expected intensities that will be incident on that portion of the focal plane array. In this manner, saturation is avoided in those portions of the focal plane that are expected to observe very high light intensities. In those portions of the focal plane that are expected to observe low light intensities, the unit cell amplifiers are designed to accommodate the lower intensity levels with decreased noise.

The segmented multiplexer of the present invention may be used with hyperspectral imagers, where across a broad spectral range, a range of intensity levels are encountered as a function of wavelength. Commercial applications include any spectrometer where a definite range of intensity levels are expected in different portions of the focal plane array. This includes non-scanning Fourier transform spectrometers, where the zero order fringe observed at the focal plane is almost twice as intense as any subsequent fringe.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1a shows a cross sectional view of the focal plane array of FIG. 1 taken along the lines 1a—1a;

DETAILED DESCRIPTION

Figure 1:
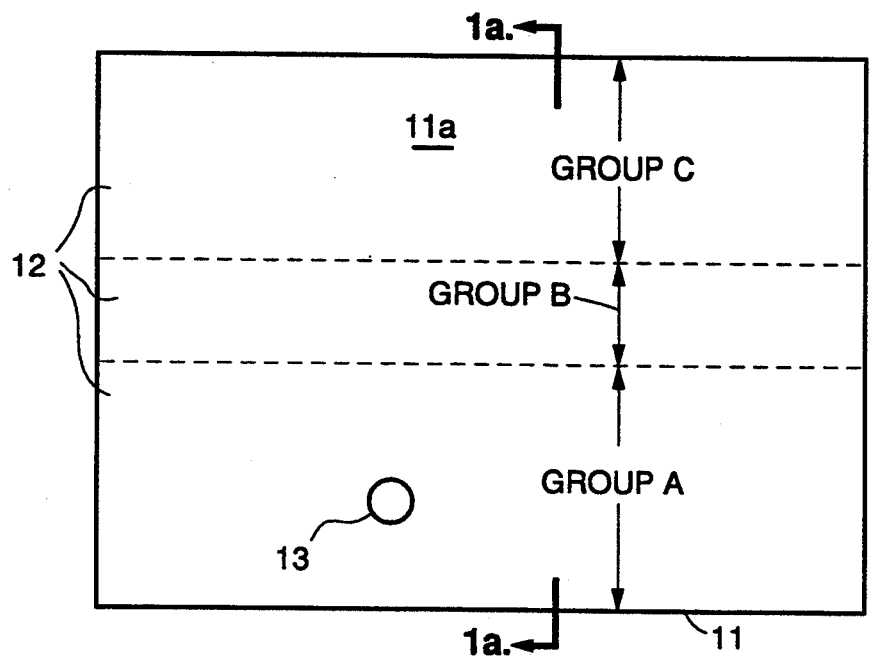
FIG. 1 shows a top view of an illustrative focal plane array made in accordance with the principles of the present invention.
Figure 2:
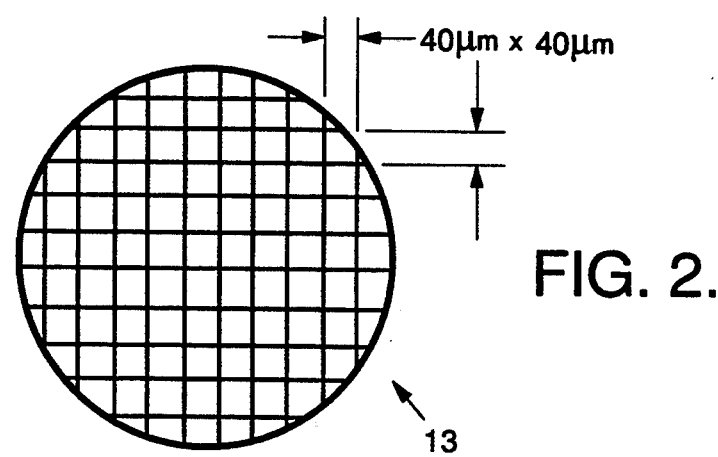
FIG. 2 shows an enlarged view of the focal plane array of FIG. 1 contained within an encircled portion thereof and showing its pixel layout.
Figure 1A:
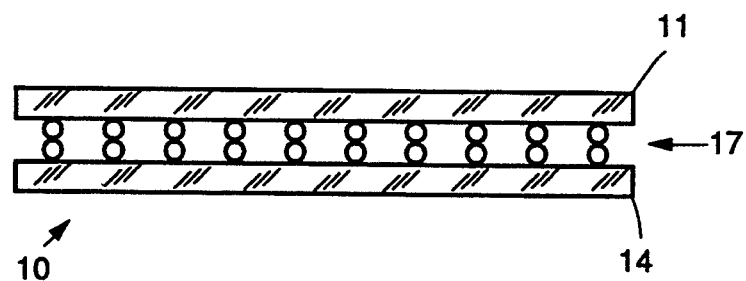

Referring to the drawing figures, FIG. 1 shows a top view of an illustrative focal plane array 10 made in accordance with the principles of the present invention. FIG. 1a shows a cross sectional view of the focal plane array 10 of FIG. 1 taken along the lines 1a—1a. FIG. 2 shows an enlarged view of a portion of the focal plane array 10 of FIG. 1 contained within an encircled portion in FIG. 1. The focal plane array 10 is comprised of a photodetector array 11 (also referred to as a detector array 11) comprising a plurality of detectors 11a that are coupled to a plurality of groups 12 of unit cells 13

(groups A, B, and C separated by the horizontal dashed lines in FIG. 1) that form a multiplexer 14 in accordance with the principles of the present invention.

Three groups 12 of unit cells 13 are shown in the illustrative embodiment shown in FIG. 1. It is to be understood that differing numbers of groups 12 of unit cells 13 may be employed in the present invention, and three groups 12 are shown for the purposes of illustration only. The detector array 11 of the focal plane array 10 is fabricated from silicon, indium antimonide, mercury cadmium telluride, or other semiconductor material. The detector array 11 may be bonded by means of indium bumps 17 (shown in FIG. 1a), for example, to a silicon readout integrated circuit (ROIC) that incorporates the segmented multiplexer 14 of the present invention.

With reference to FIG. 2, it shows the pixel layout of the focal plane array 10. The focal plane array 10 comprises a rectangular array of 320 pixels by 210 pixels in a 12.8 mm by 8.4 mm area. Each of the pixels in this illustrative example is approximately 40 μm by 40 μm in size, as is shown in FIG. 2.

Figure 3A:
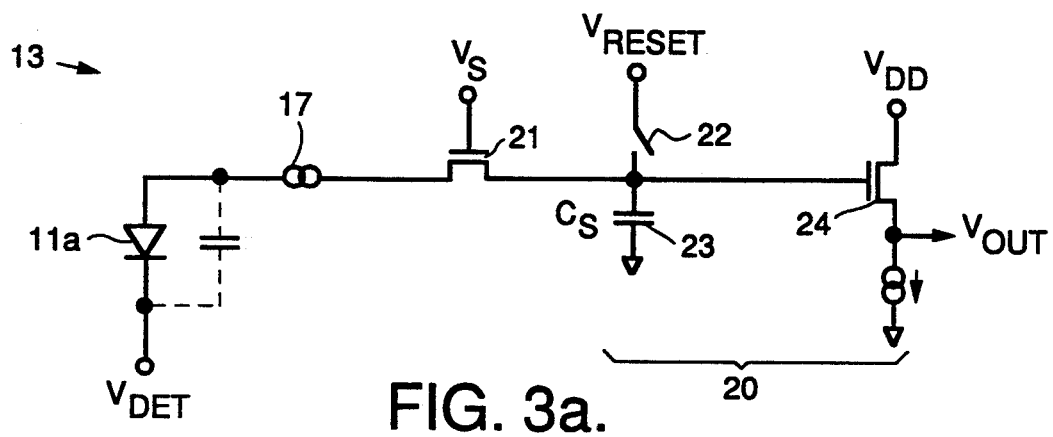
FIGS. 3a–3c show typical unit cell designs employed in the focal plane array of FIG. 1.
Figure 3B:
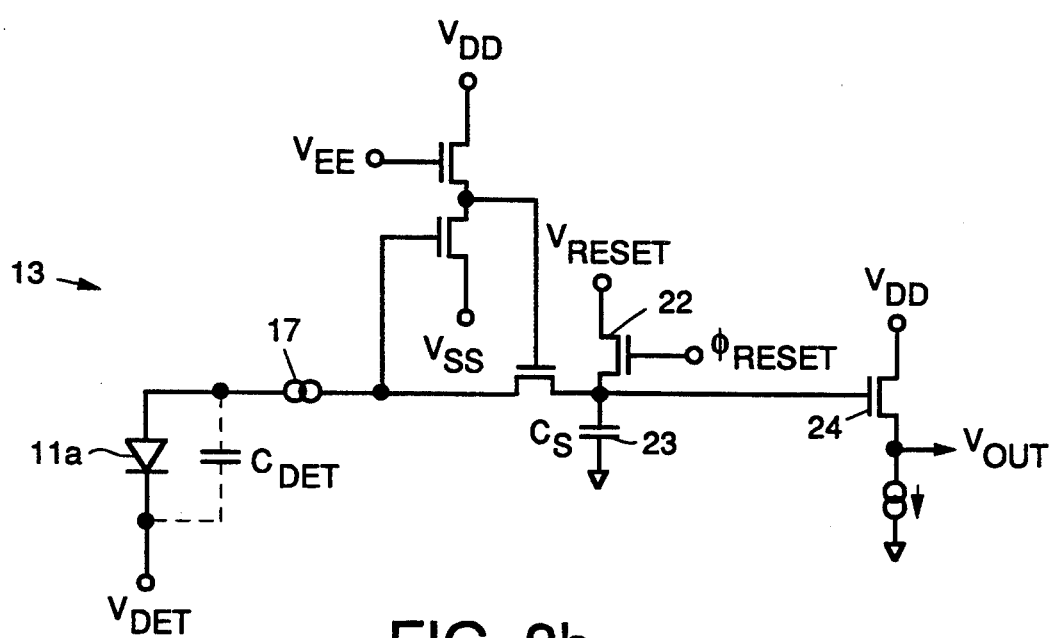
Figure 3C:
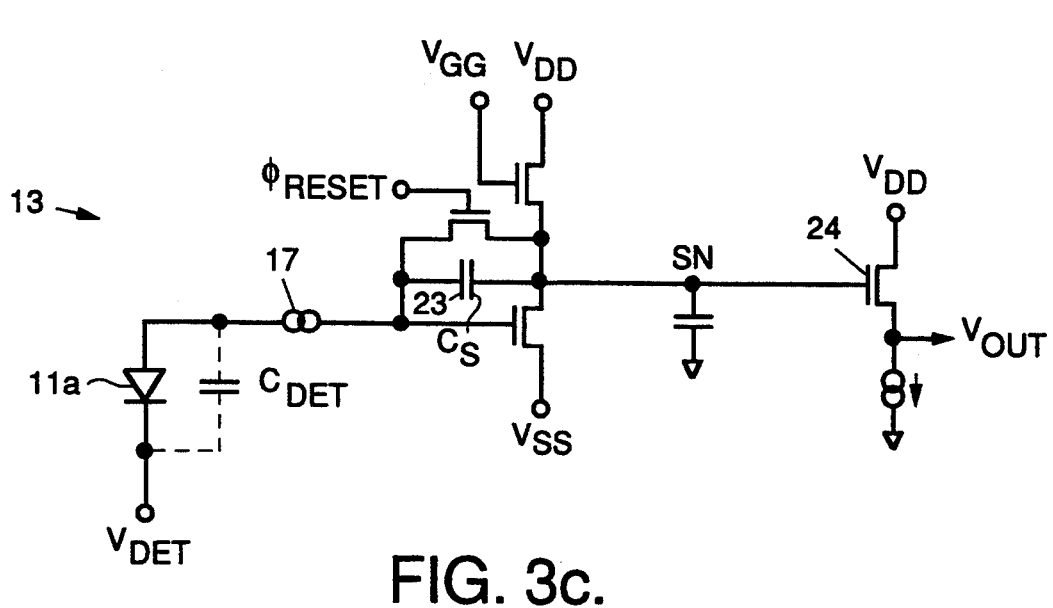

FIGS. 3a-3c show typical unit cell designs that may be employed in the focal plane array of FIG. 1. FIG. 3a shows one design of the unit cell 13 employed in the multiplexer 14 of the focal plane array 10 of FIG. 1. Each unit cell 13 is coupled to a detector 11a by means of a bond comprising the indium bumps 17, for example, and is comprised of an amplifier 20 that includes a transistor switch 21, a reset switch 22, an integrating capacitor 23 (or sensing capacitor 23) and an output amplifier 24 (output transistor 24) as is shown in FIG. 3a. The basic layout of the unit cell 13 shown in FIG. 3a is conventional. However, optimization of the unit cells 13 in the plurality of groups 12 and the resulting multiplexer 14 are improvements that are provided by the present invention. Table 1 below illustrates the typical characteristics of the unit cells 13 contained within each of the respective groups 12 of multiplexer unit cells 13.

TABLE 1

| ROW GROUP | SPECTRAL REGION (nm) | WELL DEPTH (electrons) | FOCAL PLANE NOISE (electrons) | INTEGRATION CAPACITOR (pF) |
|---|---|---|---|---|
| A | 40-1300 | $9.4 \times 10^6$ | 1700 | 0.55 |
| B | 1300 1790 | $4.6 \times 10^6$ | 800 | 0.27 |
| C | 1790-2500 | $1.4 \times 10^6$ | 300 | 0.08 |

Figure 4:
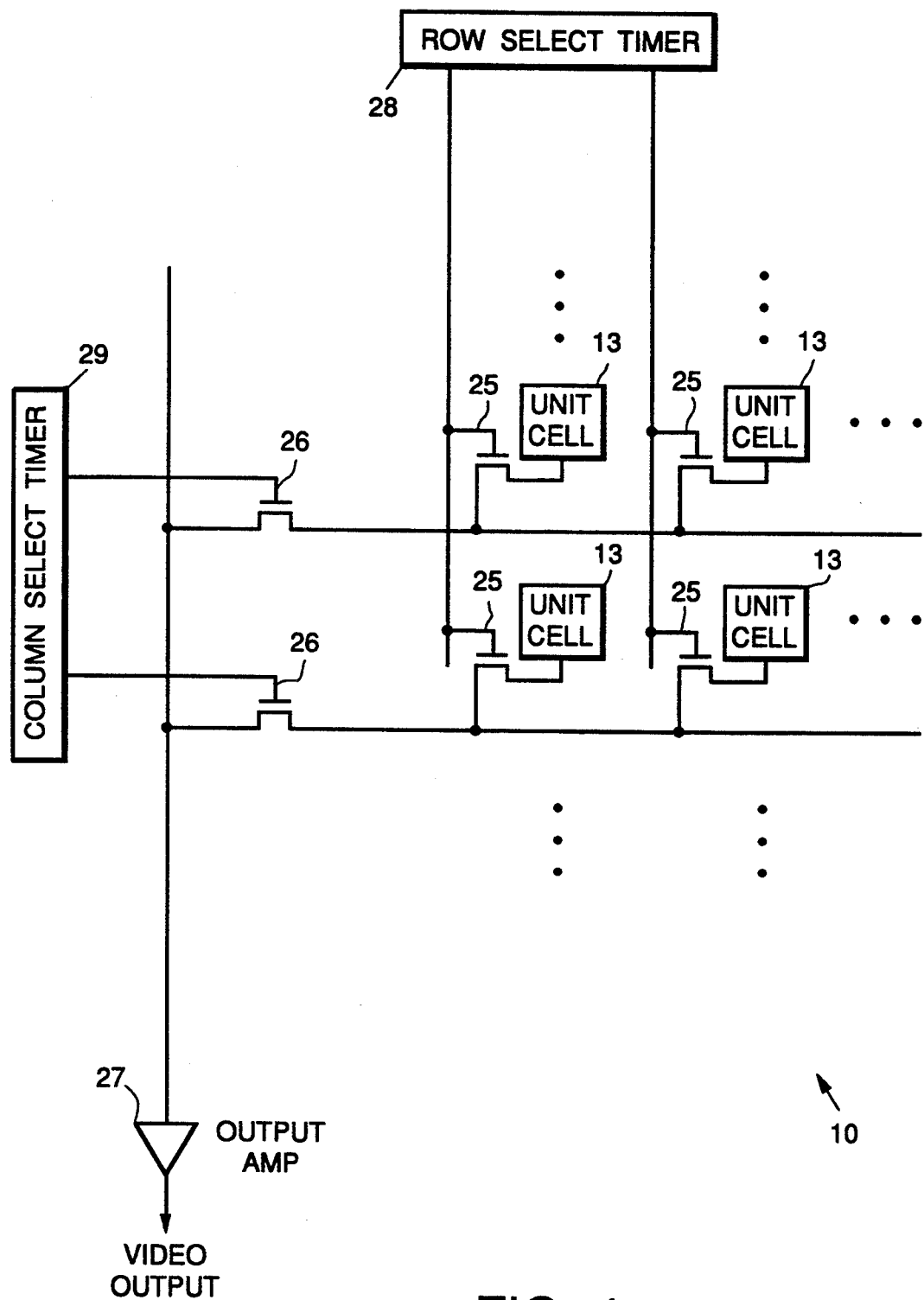
FIG. 4 shows the interconnection of multiplexer unit cells in the focal plane array of FIG. 1.

FIG. 4 shows the interconnection of multiplexer unit cells 13 in the focal plane array 10 of FIG. 1. Each unit cell 13 is connected by way of row and column select switches 25, 26 to a common video output amplifier 27. The row and column select switches 25, 26 are connected to row and column select timers 28, 29 in a conventional manner. The operation of this circuit arrangement is well known to those skilled in the art and will not be described in further detail.

In operation, and with reference to FIG. 3a, each detector is bonded by means of the indium bumps 17 to the corresponding unit cell 13 of the multiplexer 14. The integrating capacitor 23 provided within each multiplexer unit cell 13 is adapted to accumulate detected charge. If a large signal is expected during operation of the focal plane array 10, this capacitor 23 is designed to have a large value. However, the noise level associated with the multiplexer unit cell 13 having a large capacitance value is also large. If elsewhere on the focal plane array 10, signals are expected to be smaller, the sensing capacitor 23 of the cell 13 is designed to have a smaller value and the associated noise level is smaller as well.

For each region, the value Cs of the integration capacitor is chosen using the formula $$C_s = I_{ph} \times t_i / V_{sat}$$

where C is the capacitance value, $I_{ph}$ is the value of the photocurrent generated in the detector element, $t_i$ is the integration time, and $V_{sat}$ is the voltage at which the output saturates. The saturation charge is is the product of the maximum expected photocurrent and the integration time. The maximum photocurrent is determined using the equation $$I_{ph} = q \times A \times N \times H$$

where $q = 1.6 \times 10^{-19}$ Coulombs, A is the area of the detector array 11, N is the photon to electron conversion efficiency for the detector material, and H is the maximum photon flux (photons per second per unit area) at the detector element 11a. For many spectrometer systems, for example, H varies as a function of wavelength in a known manner, and varies predictably in different regions of the focal plane array 10. In each region, the minimum value of C is chosen to accommodate the maximum expected photon flux. This ensures that the largest possible voltage is achieved on the integration capacitors 23.

In operation, and with reference to FIGS. 3a and 4, the switch 22 is closed briefly, precharging the integration capacitor 23 to a negative voltage $V_{reset}$. Photocurrent generated in the detector element 11a flows through the transistor 21 and discharges the integration capacitor 23. The voltage on the integration capacitor 23 is buffered by the output transistor 24. At the completion of the signal integration period $t_i$, the output voltage $V_{out}$ is briefly connected via the row and column select switches 25, 26 to the common video output amplifier 27, as shown in FIG. 4. The sampled voltage level at the video amplifier 27 is thus proportional to the photon flux at the corresponding detector 11a. The proportionality constant varies in accordance with the value of the integration capacitor 23.

The design of the unit cell 13 shown in FIG. 3a is known as a direct injection circuit, one of several circuit configurations that may be employed to effect the present invention. The present invention may be applied equally well with other unit cells 13, including a buffered direct injection circuit shown in FIG. 3b, and a capacitive transimpedence circuit shown in FIG. 3c. In each case, the unit cell 13 may be optimized for each region by selection of the value of the integration capacitor 23 ($C_s$). The designs of these circuits are well known to those skilled in the art and will not be described in detail.

The measurement of the photon flux may be corrupted by various voltage noise sources within the focal plane array 10. These include thermodynamic (kTC) noise due to resetting the integration capacitor 23, noise in the buffer transistor 24, and noise generated by switching transistors in the multiplexer 14. Because the present invention minimizes the integration capacitance, and maximizes the integrated signal voltage, the signal to noise ratio is maximized for each spectral region. An additional benefit of the present invention is that the number of bits required for analog to digital converters that quantize the output from the focal plane array 10 are reduced. This is because the maximum output voltage is reduced in regions of the array 10 where large signals are anticipated.

Figure 5:
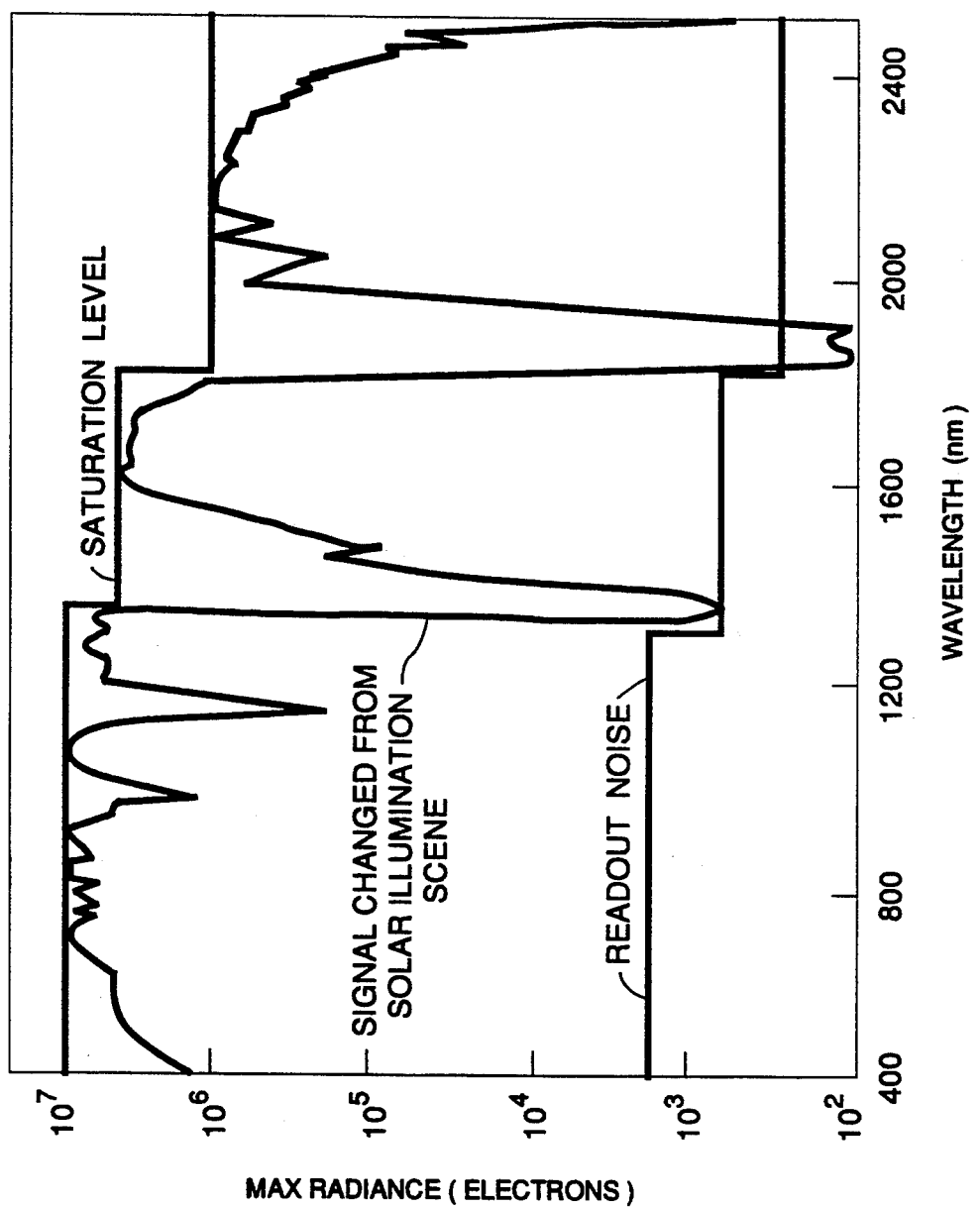
FIG. 5 shows a graph of dynamic range versus wavelength for the focal plane array of FIG. 1.

Examples of applications where the present multiplexer 14 is useful are described below. Applications include a hyperspectral imager for observing the earth using 0.4 to 2.5 μm wavelength solar illumination, as shown in FIG. 5. For this application, the segmented multiplexer 14 of the focal plane array 10 is configured to have different unit cells 14 with a different value sensing capacitor 23 for sensing light energy in each of three spectral regions. In particular, from 0.4 to 1.3 μm, the capacitor 23 is designed to provide a well depth of 9.6 million electrons; from 1.3 to 1.7 μm, the capacitor 23 is designed to provide a well depth of 4.6 million electrons; from 1.7 to 2.5 μm, the capacitor 23 is designed to provide a well depth of 1.4 million electrons. Due to the shape of the graph of solar spectral radiance versus wavelength, and atmospheric absorption, the configuration of this segmented multiplexer 14 avoids saturation while providing high signal to noise ratio throughout the spectral range, as shown in FIG. 5.

Another application includes a hyperspectral imager for observing the thermal emission of the earth using 3 to 14.5 μm wavelength radiation. The segmented multiplexer 14 of the focal plane array 10 is configured to provide two regions with different unit cell designs. In the 3 to 5 μm region, the signal levels are low due to the natural fall-off of the thermal emission of a blackbody at 300° K. Here, the unit cell 13 is designed to have a low value integration capacitor 23, and therefore produces low noise. In the 8 to 14.5 μm region, the thermal emission due to the earth peaks, and the signal is larger by more than an order of magnitude, relative to the 3 to 5 μm spectral region. Accordingly a much larger integration capacitor 23 is necessary, and higher noise is tolerable. Thus a two segment multiplexer 14 avoids saturation in the 8 to 14 μm spectral region, while maximizing signal to noise ratio in the 3 to 5 μm region.

Another application is that of a Fourier transform spectrometer for observing any radiation source. A zero path length region of an interferogram has almost twice the signal of other portions of the interferogram. The first dark fringe of the interferogram may have as little as one third of the peak interferogram radiance. Farther out the interferogram settles to half the zero path length peak radiance. In accordance with the present invention, the integration capacitor 23 used in the multiplexer unit cell 14 of the focal plane array 10 is matched to the relative intensity of the interferogram.

The specifics of a reduced to practice embodiment of the present invention will now be discussed. The detector array 11 is fabricated from indium antimonide (InSb). The segmented multiplexer 14 is configured as a 320×210 array with 40 μm×40 μm unit cells 13. In the column (210) direction, amplifiers 20 having different designs are employed in three different regions as shown in FIG. 1. The parameters associated with this design are summarized in Table 1 above, which shows the characteristics of the focal plane array 10 using the present segmented multiplexer 14. A relatively large capacitor 23 that accommodates the charge from a high level signal produces correspondingly larger noise. For rows 1 through 102 of the focal plane array 10, which includes the spectral region between 400 and 1300 nm, the focal plane noise is 1700 electrons because of the larger well depth utilized to meet a desired dynamic range requirement. By designing the amplifiers 20 of the unit cells 13 within a column region to accommodate the expected maximum signal in the corresponding spectral region, the desired dynamic range and signal to noise requirements are met.

Thus there has been described a new and improved focal plane array having a segmented multiplexer that may be used in spectroscopy applications. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A focal plane array comprising:
   an array of detectors comprising a plurality of groups of detector elements that each detect energy in a predetermined spectral region; and
   an array of multiplexer cells comprising a plurality of groups of multiplexer cells respectively coupled to the plurality of groups of detector elements of the array of detectors, wherein each multiplexer cell is comprised of an integrating capacitor, and wherein the integrating capacitor of each cell in a particular group has a predetermined capacitance whose charge integration capability corresponds to an expected maximum intensity level of radiation in a particular spectral region that is detected by the corresponding detector element in the detector array.

2. The focal plane array of claim 1 wherein the capacitance of each integrating capacitor is chosen such that the maximum signal charge integrated thereby generates a voltage level which is just below the saturation voltage of its associated detector.

3. The focal plane array of claim 1 wherein each group of capacitors has different capacitance values, and whererin each integrating capacitor within a particular group is substantially the same.

* * * * *